Figure 1:
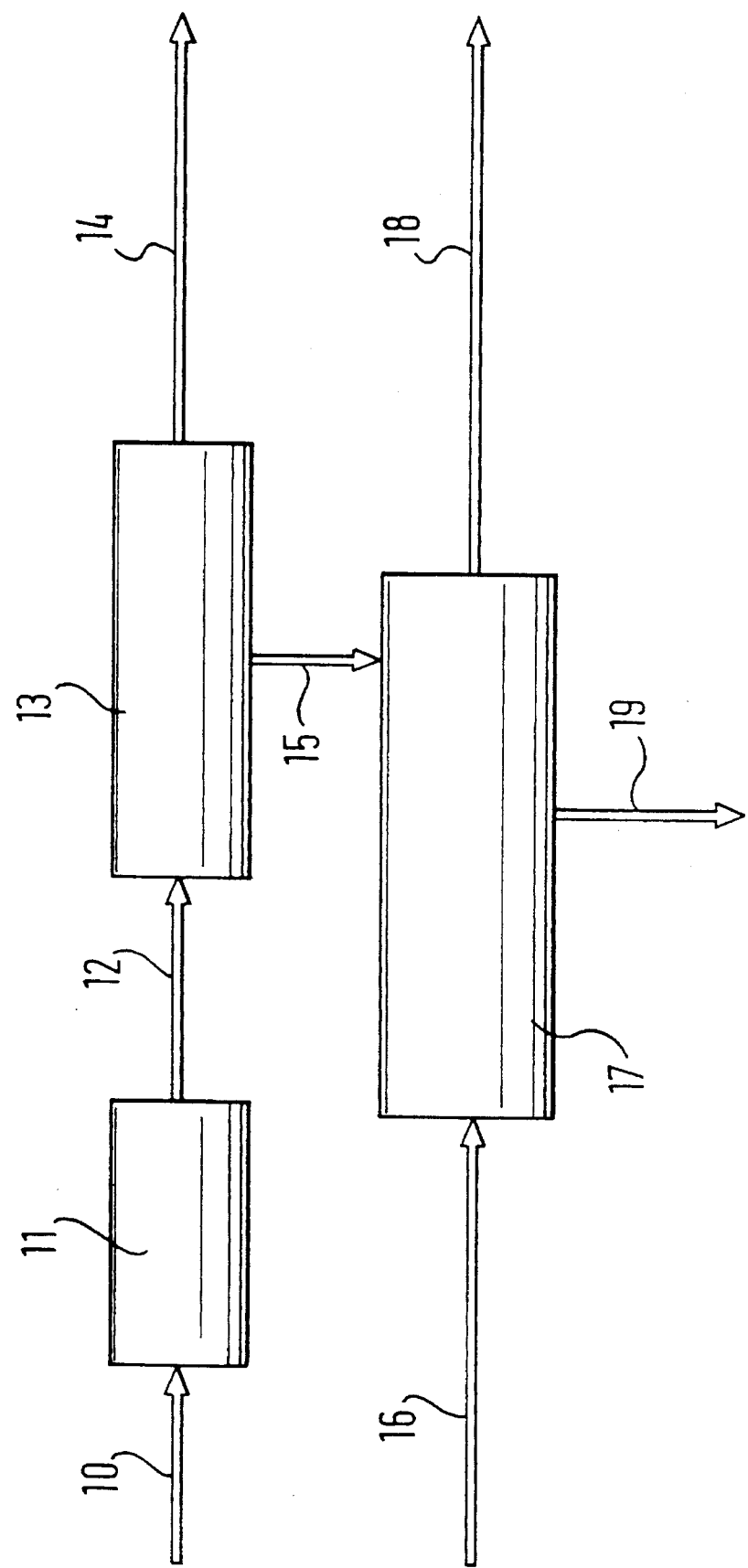

United States Patent [19]

Discher et al.

[11] Patent Number: 5,547,490

[45] Date of Patent: Aug. 20, 1996

[54] METHOD AND INSTALLATION FOR REMOVING LEAD AND ZINC FROM FOUNDRY DUST

[75] Inventors: Heinz-Peter Discher, Offenburg; Ekkehard Greinacher, Hanover; Hans Banski, Nürnberg, all of Germany

[73] Assignee: Sudweststahl GmbH, Kehl AM Rhein, Germany

[21] Appl. No.: 307,758

[22] PCT Filed: Mar. 26, 1993

[86] PCT No.: PCT/EP93/00747

§ 371 Date: Sep. 26, 1994

§ 102(e) Date: Sep. 26, 1994

[87] PCT Pub. No.: WO93/19213

PCT Pub. Date: Sep. 30, 1993

[30] Foreign Application Priority Data

Mar. 26, 1992 [DE] Germany ............ 42 09 891.2

[51] Int. Cl.[6] ............ C22B 7/02; C22B 19/04; C22B 13/02

[52] U.S. Cl. ............ 75/665; 75/694; 75/961; 266/145

[58] Field of Search ............ 266/145; 75/961, 75/665, 694

[56] References Cited

U.S. PATENT DOCUMENTS 2,045,639   6/1936   Eulenstein et al. ............ 266/145
4,673,431   6/1987   Bricmont .

FOREIGN PATENT DOCUMENTS 0176499   9/1985   European Pat. Off. .
538717    4/1993   European Pat. Off. ............ 75/961
3131898   3/1986   Germany .
3427631   4/1987   Germany .
3705787   9/1988   Germany .

Primary Examiner—Melvyn Andrews
Attorney, Agent, or Firm—Lahive & Cockfield

[57] ABSTRACT

The foundry dust is fed to a first furnace atmosphere which is preferably at 1000° to 1100° C. With the dust pellet being continuously rolled around, it remains therein until in particular chlorine, alkali and lead compounds have almost completely evaporated out of the dust. Experience has shown this takes an hour. In that operation a scavenging gas flow is fed to the furnace atmosphere whereby the lead-chlorine-alkali vapour produced in the rotary cylindrical furnace is passed out of sane to a condensation and filtering apparatus.

Reducing agent, in particular coal, is then introduced into the foundry dust and same is fed to a further furnace atmosphere which in particular is at 1150° to 1350° C., where it is continuously rolled around. In that way the zinc oxide contained in the dust is reduced, the dust remaining in the furnace until zinc has substantially completely evaporated in the form of zinc metal vapour out of the dust into the oxygen-bearing furnace atmosphere and there the zinc metal has changed to zinc oxide. Experience has shown this takes up to two hours. In that operation once again a scavenging gas flow is fed to the furnace atmosphere, to carry the zinc oxide out of the furnace, where the scavenging gas is cooled with the zinc oxide and filtered.

30 Claims, 2 Drawing Sheets

METHOD AND INSTALLATION FOR REMOVING LEAD AND ZINC FROM FOUNDRY DUST

The invention concerns a method of the kind set forth in the classifying portion of claim 1. It also concerns an installation for carrying out the method, as set forth in the classifying portion of claim 17.

In the production of iron and steel, fine-grain dusts are generated for example in electrical filters for removing dust from the waste gases from converters or in electrical furnaces, the dusts primarily consisting of iron but also containing zinc, lead and alkalies. The disposal of such dusts gives rise to difficulties.

The way of disposing of such residual substances, which in itself is the most obvious method, namely dumping sane, is becoming increasingly difficult for reasons of environmental protection but also because of the steadily increasing costs and the rapidly shrinking capacities of the special waste dumps available. In addition, considerable amounts of iron, zinc and lead are lost as being unused when such materials are dumped.

This situation compelled the industrial circles involved to develop an economic procedure for processing the dusts. On the one hand hydrometallurgical methods are known for processing the dusts, such as alkaline leaching. However, because of the large amount of water used, such methods give rise to problems in regard to waste water and achieve only low space/time yields. On the other hand pyrometallurgical methods are also known. In such methods non-ferrous metals, primarily zinc and lead, and inevitably therewith also chlorides and alkali, are enriched. A number of such methods, for example the plasma method, permits the direct production of zinc and lead metal, with enrichment by non-ferrous metals. In that procedure however chloride waste is produced in a considerable amount, which is very difficult to dispose of.

At the present time a combination of the rolling method and the imperial smelting method is the most widely used procedure for processing of the dusts.

In the known rolling method, a mixture of sand, coke and foundry dust is continually introduced from one side into a slightly inclined, slowly rotating rotary cylindrical kiln or furnace. Hot air is fed in a controlled fashion from the other side. In the rotary cylindrical furnace, vapours issue from the mixture at a temperature of about 1250° C. and oxidise in the atmosphere in the furnace in order inter alia to form zinc and lead oxides. Those oxide vapours are passed to a cooling apparatus and are cooled down therein and are then passed to an electrical separator where the rolled oxide containing lead and zinc is separated off.

Preferably the oxide is then briquetted and then subjected, together with a reducing agent, in particular coke, to the known imperial smelting procedure. In a blast furnace which then contains rolled oxide and coke, both zinc vapour and also crude lead are obtained and slag is produced. The zinc vapour is passed out of the blast furnace to a condenser where it meets an intensive shower of lead drops and there condenses. In that case the resulting lead-zinc solution is continuously pumped into a cooling system where it is cooled down; the crude zinc which is accumulated in the cooling procedure below the saturation limit on the surface of the lead is tapped off and the remainder, therefore essentially the lead, is fed to the spray condenser again.

Although high levels of through-put can be achieved with the rolling method and zinc and lead can be recovered from the foundry dust in the subsequent imperial smelting method, the installations required for the respective procedures are highly cost-intensive. In order to be able to work economically, they must always be operated in a fully extended fashion. In that respect considerable transportation costs are incurred in bringing the foundry dusts from the individual steel works to the rolling installation and then taking the rolled oxide to the central imperial smelting installations. Transportation is made more difficult by dioxin and furan contents which are possibly present in the material to be processed.

It has been found that there is the disadvantage that the chloride and alkali contained in the foundry dusts is concentrated in the rolling procedure so that further processing of the rolled oxide is restricted to the zinc metallurgical plants which operate in accordance with the imperial smelting procedure. However that procedure is highly expensive in terms of the recovery of zinc as only 10 to 20% by volume of rolled oxide can be processed with 80 to 90% by volume of iron ore.

It has also been proven expensive that, in the rolling procedure, for forming suitable slags, the operation must be conducted with additives of about 20 to 25%, relative to the foundry dust. In that connection the slag which is produced, that is to say the discharge from the rolling operation, is not always suitable or admitted as a building material so that it in turn has to be dumped.

Another disadvantage is the amount of energy required for the processing operation, in particular because large masses in the form of the cylindrical rotary members which are lined with refractory material have to be supported and moved. The repairs which may possibly be required to the mechanism of the cylindrical rotary members and the refractory linings are highly complicated and expensive. For example, in the event of damage to the refractory linings, they have to be replaced by dismantling the cylindrical rotary tube members and disposed of as special waste at special waste dumps.

DE 37 05 787-Al discloses a method of removing lead oxide which occurs as a soluble impurity of zinc oxide in recovered waste dust, wherein, in a first stage, the waste dust is heated in an oxidising atmosphere to a temperature which is sufficient to form lead oxide vapours, the lead oxide vapours are separated from the fluid or sintered, zinc oxide-containing mass and solidified, and the hardened lead oxide is recovered. The oxidised residual material which is charged with zinc oxide is heated in a reducing atmosphere to a temperature which is sufficient to reduce the zinc oxide, with the formation of zinc vapours. The zinc vapours are separated from the reduced residual mass and the solidified zinc vapours are filtered.

The operation of heating the material to be treated is effected directly in the two stages. The vapours of the lead oxide are removed in the first stage from the oxidation chamber with the fuel gas, and the zinc vapours are discharged together with the waste gases from the reduction chamber. The operation of heating the preferably pelletised waste dust is effected in the first stage at a temperature which is above the vaporisation temperature of lead oxide, that is to say above 1475° C. The operation of heating the oxidised residual mass in the reducing atmosphere is preferably effected at a temperature of about 980° C. and should not be at a temperature of higher than 1093° C.

High temperatures are considered necessary for the removal of lead in the case of the method described in the above-mentioned publication—from 1482° C. to 1538° C. are specified as a preferred range—so that a comparatively high level of expenditure in terms of energy and furnace materials is required for the known method. Due to direct heating of the material to be treated and the use of the waste gas flows of the fuel material for discharge of the harmful substances or pollutants from the furnace, rapid cooling, that is to say quenching, of the furnace waste gases is also not possible because of the large amount of waste gases, at a reasonable level of energy expenditure, so that dioxin recombination phenomena can occur.

The object of the present invention is to provide a method of the kind set forth in the classifying portion of claim 1, which, while avoiding the specified disadvantages, permits simple, inexpensive and substantially complete recovery, that is to say recycling, of zinc, lead and iron from the foundry dusts containing those metals. The invention further seeks to provide that the level of energy expenditure and the degree of material wear are reduced.

The invention also seeks to provide that the amount of waste gases from the process gas can be kept low so that dioxin recombination can be prevented, by quenching of the gas. Finally the invention aims to provide an installation for carrying out the method according to the invention.

In accordance with the invention that object is attained by the method steps recited in claim 1. Advantageous configurations of the method are set out in the appendant claims, and likewise an installation for carrying out the method.

The invention is based on the discovery that the element lead to be removed is present in the foundry dust mainly in the form of alkalichloride complexes which vaporize at low temperatures (850° C.) and can be separated off. Thus, in a departure from the quoted state of the art, it is possible to provide for energy-saving separation of lead, which involves a lower level of loading on the equipment, at low temperatures. The preferred temperature range is between 900° C. and 1100° C., that is to say clearly below the minimum temperate of 1482° C. specified in the state of the art.

In the method according to the invention processing is effected in the following method steps:

Firstly the foundry dust is subjected to heat treatment in a furnace atmosphere of a (second) furnace, which furnace atmosphere is preferably hot at a temperature of 1000° to 1100° C., for separation of the lead. While the dust or the dust pellets are being continually rolled round, the dust remains there until the lead chloride and lead alkali complexes have almost completely evaporated out of the dust. Experience has shown that this takes about three quarters of an hour. In that procedure, a scavenging or flushing gas flow is continuously or intermittently passed through the furnace whereby the lead chloride and lead alkali vapour which is separated off in the furnace is discharged therefrom to a cooling and filtering apparatus. The zinc-bearing residual material after treatment in that way, when mixed with a solid, fine-grain reducing agent, in particular coal, is then subjected to a heat treatment in a further furnace atmosphere of a (third) furnace, which atmosphere is at a temperature in particular of 1150° C. to 1350° C., for separation of the zinc, and is continuously rolled around therein. In that way the zinc oxide contained in the furnace dust is reduced. The dust remains in the rotary cylindrical furnace until zinc has almost completely evaporated as zinc metal vapour out of the dust into the oxygen-bearing furnace atmosphere in which the zinc metal oxidises to give zinc oxide. Experience has shown that this takes half an hour to two hours. In that operation once again a scavenging or flushing gas flow is continuously or intermittently passed through the furnace whereby the zinc oxide is discharged therefrom. The scavenging gas charged with the zinc oxide is cooled and filtered.

In the first method step therefore firstly those elements which have a disadvantageous effect on the subsequent use of the dust as a recycled product are removed, together with lead, from the dust; they substantially involve chlorides and chloridic complexes of lead and alkali metals, that is to say essentially $PbCl_2$, $KPb_2Cl_5$ and $NaCl$, $KCl$. That chlorine-alkali-lead fraction can be subjected to hydrometallurgical processing in known manner to form lead sulphate and the other heavy metals can be precipitated as sulphides. The remaining clear alkali chloride lye which then essentially contains potassium can be used in agriculture as fertisiler or for building up the potassium value in the processing of aluminium covering salts.

The foundry dust which is substantially freed from the chloridic fraction essentially still contains the valuable substances iron and compounds thereof as well as zinc oxide. In the second step in the method those valuable substances are extensively separated from each other. The zinc fraction which is obtained in that case then still has only those iron, chlorine, alkali and lead values which correspond to the usual burnt or roasted ore materials. That product can be introduced into different procedures in zinc metallurgical plants and on the part of manufacturers of zinc compounds, and is not only dependent on use in zinc metallurgical plants which use the imperial smelting procedure. In the case of further processing of the zinc fraction in zinc electrolysis, iron compounds such as jarosite which would have to be deposited on special dumps are also avoided by virtue of the low residual iron content in the zinc fraction.

The iron fraction which is obtained from the processed dusts can be fed directly to the steel works process.

It is also desirable however for the foundry dust, before being fed to the second furnace for the lead separation operation, to be preheated and dried in a furnace atmosphere of a first furnace, which atmosphere is at a temperature of up to 600° C. That avoids high fluctuations in temperature with the introduction of the foundry dust into the furnace atmosphere of the second furnace. Furthermore moisture which is possibly contained in the foundry dust is removed and the dust is thereby dried. That avoids the possibility of an adverse effect in the method steps which then follow, due to water vapour.

An advantageous embodiment of the invention also provides that the furnaces in which the foundry dusts are processed are indirectly heated. On the one hand that can provide for multiple utilisation of the heat and ease of heat recovery. On the other hand contamination of the products which vaporise in the furnace due to additional dust in the heating gases is kept at a low level and the amount of scavenging gas is not loaded with an additional amount of heating gas. In that case, only a small controllable carrier gas flow of a scavenging gas is required in each case for discharge of the lead compounds, and the carrier gas flow can be optimised in accordance with quantitative flow but also in regard to its properties such as oxidation and reduction.

As the amount of scavenging gas can be kept at a low level when using indirect heating, sudden cooling of the hot scavenging gas flow after leaving the furnace is also possible, at a low level of energy expenditure, thereby avoiding the risk of dioxin recombination.

The furnaces are preferably in the form of rotary cylindrical furnaces, wherein the indirectly heated rotary cylindrical member of the first furnace for preheating and drying the charge material preferably comprises metal, in particular heat-resistant steel alloy, while the indirectly heated rotary cylindrical members of the second and third rotary cylindrical furnaces for lead and zinc separation preferably comprise oxide ceramic material because of the higher temperatures. In that arrangement the ceramic wall of the rotary cylindrical member is to be as thin as possible in order to minimise the resistivity to heat and to eliminate inadmissibly high temperature gradients. Plasma-sprayed ceramic cylindrical members have proved to be particularly advantageous here. As the method according to the invention, in the lead separation stage, involves operating at temperatures below 1300° C., there is the risk, in contrast to the known method described in the introductory part of this specification, that the charge material involves sticky and liquid phases which could penetrate into the porous furnace wall and destroy same.

The indirectly heated wall of the cylindrical ceramic members is the hottest surface in the process chamber. The scavenging gas flows which are passed through the process chamber provide for a quenching effect immediately downstream of the hottest zone so that the feared formation of rings of condensates and sublimates can be prevented and the costs of maintenance operations can be reduced.

Figure 2:
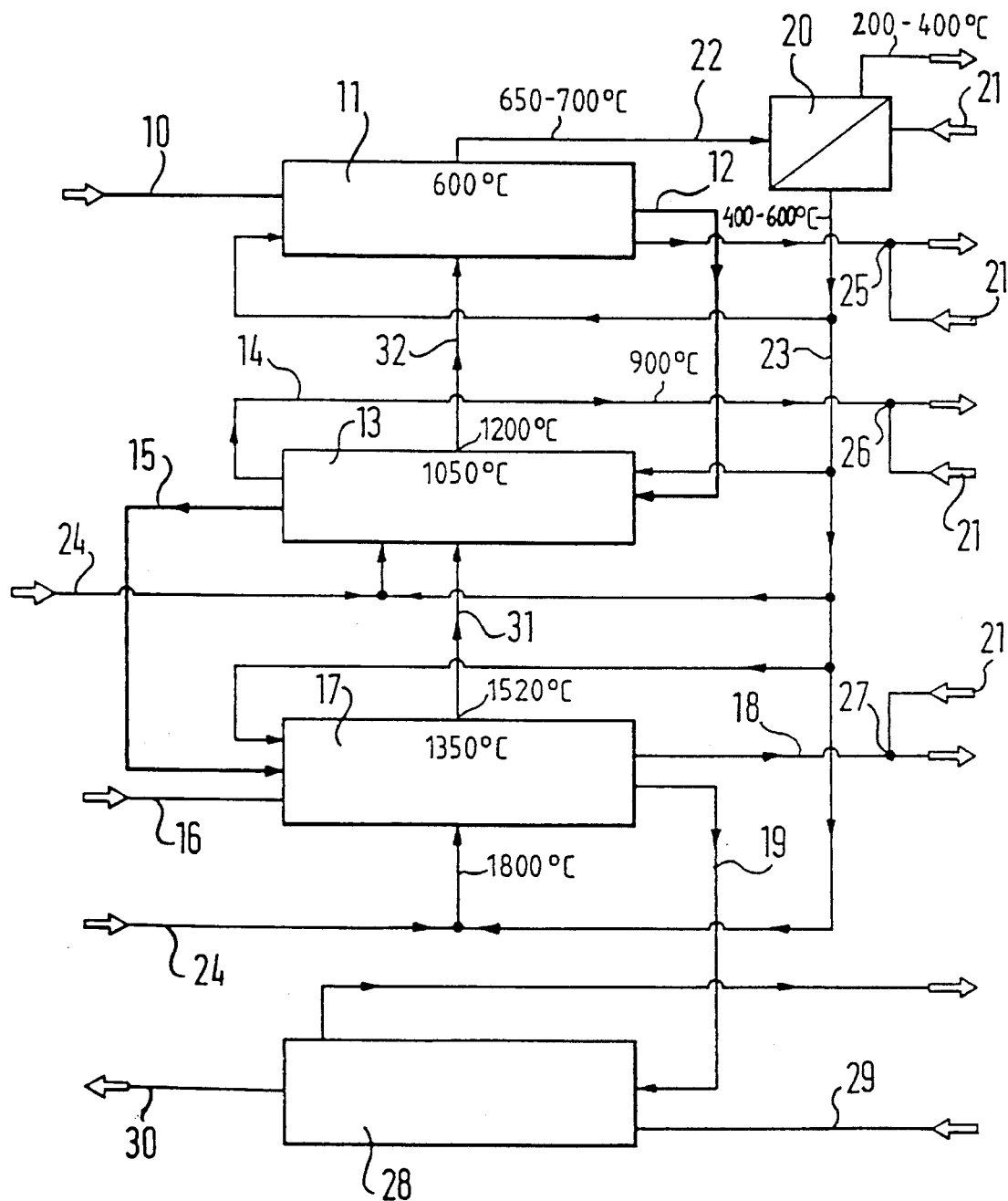

Further advantageous configurations form the subject-matter of the appendant claims or are set forth in greater detail hereinafter together with the description of the preferred embodiment of the invention with reference to the Figures in which:

FIG. 1 is a diagrammatic view of the individual method steps of an embodiment of the invention, and FIG. 2 is a diagrammatic view of the gas flows and the flow of materials in the embodiment.

FIG. 1 diagrammatically shows three method steps.

The foundry dust which originates from an electric furnace and which contains inter alia zinc and lead is firstly pelletised in known manner, that is to say the fine-grain dust is made into pieces or lumps.

That foundry dust when processed to form pellets 10 is then passed into a rotary cylindrical furnace 11 and indirectly heated therein at up to 600° C. In that operation the pellets 10 are continually rolled around by continuous rotary movement of the rotary cylindrical member of the rotary cylindrical furnace 11. The moisture which is contained in the pellets 10 and which was introduced in particular by the pelleting operation is almost completely evaporated in that operation, without however destroying the shape of the pellets 10. The vapour is displaced out of the first rotary cylindrical member by a hot air flow, an aspect which will be discussed in greater detail hereinafter with reference to FIG. 2.

The rotary cylindrical member of the rotary cylindrical furnace 11 may comprise metal, in particular heat-resistant steel alloy, as the rotary cylindrical furnace 11 is only heated at up to 600° C. and there is therefore no possibility of scaling of the rotary cylindrical member which would begin at about 900° C.

The preheated pellets 12 coming from the rotary cylindrical furnace 11 are now fed to a second rotary cylindrical furnace 13 and are indirectly heated therein at 900° C. to 1100° C., preferably 1000° C. to 1100° C. In the second rotary cylindrical furnace 13 the rotary cylindrical member is formed from ceramic material. In comparison with a conventional rotary cylindrical member which is provided with a refractory fireclay-like lining, a ceramic rotary member is of substantially lower weight and is thus easier to handle. In addition ceramic is more resistant to temperature shock and temperature change; rotary cylindrical members of that kind are also corrosion-resistant in relation to acids and aggressive agents such as halides (for example chlorine).

While the rotary cylindrical member continuously rotates, the pellets 12 remain approximately one hour in the second rotary cylindrical furnace 13. Therein in particular lead-chloride, lead-alkali and other alkali and chlorine compounds evaporate. In particular therefore those elements and compounds which would have a disadvantageous effect in relation to the subsequent recycled products (zinc and lead) are removed.

The vapour 14 which is produced in the second rotary cylindrical furnace 13 and which contains the lead components is caught by a hot air flow which is introduced through a gas inlet on one end of the rotary cylindrical member at which the hot pellets 12 are also introduced into the rotary cylindrical furnace 13. The scavenging gas flows also prevent charged gases which leave the actual hot treatment zone from being able to come into contact with colder walls. There would be the risk of condensation and sublimation of compounds at such wall surfaces, and that would therefore entail the risk of blockages. The hot air issuing from the rotary cylindrical furnace 13, with the vapour 14 containing the lead component, is fed through a gas outlet at the other end of the rotary cylindrical member to a cooling apparatus (not shown here) and then a filtering apparatus, the fraction which is separated off therein then being subjected to further processing in known manner.

The pellets 15 which are processed in that way and which now essentially consist of iron and zinc are fed together with coal 16 to a third rotary cylindrical furnace 17 which is also indirectly heated, rolled around therein with continuous rotary movement of the rotary cylindrical member which is also of ceramic material, heated to 1100° C. to 1400° C., preferably 1150° C. to 1350° C., and mixed with coal 16 in grain or dust form. In that situation the zinc oxide contained in the processed pellets 15 is initially reduced and evaporates as zinc metal vapour out of the pellets 15 into the oxygen-bearing furnace atmosphere which occurs thereabove. Here, the carbon monoxide which rises out of the coal 16 is oxidised to give carbon dioxide and the zinc metal becomes zinc oxide. A hot air flow which flows into the rotary cylindrical furnace 17 through a gas inlet at the one end of the rotary cylindrical furnace 17 at which the pellets 15 are also introduced carries the zinc fraction 18 by way of a gas outlet at the other end of the rotary cylindrical furnace 17 for fast cooling into a cooling apparatus (not shown here) and then into a filtering apparatus. The zinc fraction 18 which is separated off in the filtering apparatus is then subjected to further processing in known manner.

The zinc fraction 18 which is separated off therein contains only small amounts of iron. That means that the disposal problem in regard to jarosite/goethite does not arise, with possibly further processing of the zinc fraction 18 by electrolysis.

Coal 16 is introduced into the third rotary cylindrical furnace 17 at least in the amount which is necessary for reduction of zinc oxide, but desirably also in the amount required for reduction also of ferric oxide ($Fe_2O_3$) which is contained in the dust pellets 15.

The thermal treatment in the second and third rotary cylindrical furnaces 13 and 17 causes decomposition of dioxins and furans which are possibly present in and issue from the dust pellets 12 and 15, to below the detection limit. Recombination of the dioxins and furans is prevented by the rapid cooling of the waste gases, both of the vapour 14 containing the lead component and also the zinc fraction 18.

As already mentioned above higher iron oxides are reduced in the rotary cylindrical furnace 17 so that the resulting iron fraction 19 is easy to introduce into steel works processes.

FIG. 2 also shows a diagrammatic view of the gas flows and flows of material.

As mentioned above all three rotary cylindrical furnaces 11, 13 and 17 are indirectly heated. That permits multiple utilisation of the heat involved and easy recovery of the heat, as will be further made clear below.

In order to achieve such heat utilisation and recovery effect, fresh air 21 and waste air 22 from indirect heating of the first rotary cylindrical furnace 11 is fed to a heat exchanger of an air heating device 20. In that connection the waste air 22 coming from the first rotary cylindrical furnace 11 is at a temperature of approximately 660° to 700° C. and is cooled by the heat exchanger to 200° to 400° C., whereas the fresh air is heated by the heat exchanger of the preheating device 20 to 400° to 600° C.

The hot air 23 when heated in that way is fed as process or scavenging gas to each of the three rotary cylindrical furnaces 11, 13 and 17. In addition the hot air 23 together with natural gas 24 is controlledly introduced into the heating chambers of the second and third rotary cylindrical furnaces 13 and 17 where the natural gas burns to heat the rotary cylindrical furnace 13 and 17 respectively.

The waste gas 31 from the heating chamber, which is produced upon heating of the third rotary cylindrical furnace 17 and which is at about 1520° C. is additionally fed to the heating chambers of the second rotary cylindrical furnace 13 and there heats the second rotary cylindrical furnace 13, in addition to the controlledly supplied and burning natural gas 24.

The waste air 32, at a temperature of about 1200° C., from the heating chambers of the second rotary cylindrical furnace 13 then exclusively heats the first rotary cylindrical furnace 11 and is then fed as waste air 22 to the heat exchanger of the preheating device 20, as already mentioned above.

The hot air 23 which is fed as process or scavenging gas to the first rotary cylindrical furnace 11 carries the moisture which evaporates out of the dust pellets 10 in the first rotary cylindrical furnace 11 to a first cooling device 25. There the hot air is quickly cooled down and the moisture condensed.

In a corresponding fashion the scavenging gas 14 which enters as hot air 23 at the second rotary cylindrical furnace 13 and which is charged with chlorine-alkali-lead vapour, after issuing from the rotary cylindrical furnace 13, is fed to a second cooling device 26. The scavenging gas which enters as hot air at the third rotary cylindrical furnace 17 and which after discharge contains the zinc fraction 18 is passed to a third cooling device 27. The scavenging gas is rapidly cooled down in each of the cooling devices 25, 26 and 27, by fresh air 21 being fed to each of the cooling devices 25, 26 and 27. The cooling devices can be in the form of indirect or direct cooling devices. In the latter preferred case the fresh air is passed into the scavenging gas flow, as shown in FIG. 2.

As already described with reference to FIG. 1, the pellets 10 are firstly fed to the first rotary cylindrical furnace 11 where they are dried and preheated. The dried and preheated pellets 12 then pass into the second rotary cylindrical furnace 13 in which essentially chlorine, alkali and lead evaporate out of the pellets 12. The pellets 15 when processed in that way are finally introduced into the third rotary cylindrical furnace 17 together with fine-grain coal 16. Here the zinc fraction 18 and the iron fraction 19 are formed in the manner described. The iron fraction 19 is introduced into a further cooling device 28 where it is indirectly cooled down with the assistance of cooling water 29.

The cooled iron fraction 30 is then fed to the steel works process again.

Indirect heating of the rotary cylindrical furnaces 11, 13 and 17 permits multiple utilisation of the heat involved and heat recovery. Preferably only gaseous fuels which do not give rise to any dust loading, such as natural gas, are used in the heating circuit. Indirect heating means that contamination of the process and scavenging gases in the rotary cylindrical furnaces 11, 13 and 17 is kept at a low level.

By virtue of this method moreover it is possible to manage without additives for the formation of slags which would have to be disposed of. In addition the method according to the invention can be operated in compact small units. It is suitable in particular for decentral processing of the foundry dust in any steel works, whereby transportation costs are almost eliminated.

We claim:

1. A method of removing lead and zinc from foundry dust material having components containing lead, zinc and alkali comprising the steps of feeding the material to be treated to a lead-processing furnace and heating the material in the lead-processing furnace only until vaporization of said lead-containing components for generating a zinc bearing residual material said lead-containing components being removed from the lead-processing furnace by means of a scavenging gas flow and the scavenging gas flow which is charged with the lead-containing components being cooled down and filtered, and heating the zinc-bearing residual material in a zinc-processing furnace under reducing conditions for reducing zinc oxide with the formation of zinc vapours, the zinc vapours being removed from the zinc-processing furnace by means of a scavenging gas flow mad the scavenging gas flow which is charged with the zinc vapours being cooled down and filtered.

2. A method according to claim 1 wherein the steps of heating the zinc-bearing residual material in the zinc-processing furnace includes the step of mixing the zinc-bearing residual material with a reducing agent in grain or dust form and maintaining an oxygen-bearing atmosphere above the residual material-reducing agent mixture, in which atmosphere the zinc vapours are oxidised to form zinc oxide and same is discharged with the scavenging gas flow.

3. A method according to claim 1 comprising the further steps of preheating and drying the material to be treated in a preheating furnace before being introduced into the lead-processing furnace.

4. A method according to claim 1 comprising the further step of pelletizing the foundry dust material before introducing the foundry dust material into the lead-processing and zinc-processing furnaces respectively.

5. A method according to claim 1 wherein the step of heating the material is carried out by indirectly heating the material in at least one of said furnaces by way of heating chambers.

6. A method according to claim 1 comprising the further step of rolling the material in at least one rotary cylindrical furnace.

7. A method according to claim 6 wherein the step of rolling the material is effected in a ceramic rotary cylindrical member of a rotary cylindrical furnace with temperatures above 700° C.

8. A method according to claim 6 wherein the step of rolling the material is effected in a metal rotary cylindrical member of a rotary cylindrical furnace with temperatures below 700° C.

9. A method according to claim 1 wherein the step of heating the material in the lead-processing furnace includes heating at a treatment temperature approximately between 900° C. and 1100° C.

10. A method according to claim 1 wherein the step of heating the material in the lead-processing furnace includes heating the material for approximately half an hour to one and a half hours.

11. A method according to claim 1 wherein the step of heating the material in the zinc-processing furnace includes heating at a treatment temperature approximately between 1100° C. and 1400° C.

12. A method according to claim 1 wherein the step of heating the material in the zinc-processing furnace includes heating the material for approximately half an hour to two hours.

13. A method according to claim 1 comprising the further step of feeding heated scavenging gas to at least one of the furnaces.

14. A method according to claim 5 comprising the further step of heating the scavenging gas by means of an indirect heat exchanger that receives hot waste gas from the heating chamber of a furnace.

15. A method according to claim 5 comprising the further step of feeding hot combustion waste air from the heating chambers of the zinc-processing furnace to the heating chambers of the lead-processing furnace as heating gas.

16. A method according to claim 5 comprising the further step of feeding hot combustion waste air from a heating chamber of the lead-processing furnace to a heating chamber of a preheating furnace as heating gas.

17. An installation for removing lead and zinc from foundry dust material, comprising a lead-processing furnace and a zinc-processing furnace each of which have a treatment process chamber having a material inlet and a material outlet a gas inlet and a gas outlet and at least one heating chamber adapted for receiving a hot gas and for thermally coupling to the treatment process chamber for heating indirectly the foundry dust material within the treatment process chamber, wherein the material outlet of the treatment chamber of the lead-processing furnace is in a material flow relationship with the material inlet of the zinc-processing furnace for allowing transfer of the material therebetween.

18. An installation according to claim 17 wherein the furnaces are in the form of rotary cylindrical furnaces with a ceramic cylindrical member as the rotary cylindrical member.

19. A method according to claim 3 wherein the material is indirectly heated in at least one of the furnaces by way of heating chambers.

20. A method according to claim 3 wherein the material is rolled in at least one rotary cylindrical furnace.

21. A method according to claim 20 wherein the step of rolling the material is effected in a ceramic rotary cylindrical member of a rotary cylindrical furnace with temperatures above 700° C.

22. A method according to claim 20 wherein the step of rolling the material around is effected in a metal rotary cylindrical member of a rotary cylindrical furnace with temperatures below 700° C.

23. A method according to claim 3 wherein the step of pre-heating includes providing hot air as the heated scavenging gas fed to the preheating furnace.

24. A method according to claim 5 wherein the step of heating material in the zinc-processing furnace includes feeding hot combustion waste air of a heating chamber of the zinc-processing furnace to heating chambers of a preheating furnace as heating gas.

25. An installation according to claim 17 further comprising a pre-heating furnace for pre-heating and drying the material and having a treatment chamber with a material inlet and a material outlet and a gas inlet and a gas outlet and wherein the material outlet is in a material flow relationship with the material inlet of the lead-processing furnace.

26. An installation according to claim 17 wherein the heating chambers of the lead-processing furnace connect to the heating chambers of the zinc-processing furnace and the hot gas received by the heating chambers of the lead-processing furnace includes hot waste gas from the heating chambers of the zinc-processing furnace.

27. An installation according to claim 17 further comprising a heat-exchanger coupled to at least one of said heating chambers and adapted for generating hot heat-exchanged gas and for providing the hot heat-exchanged gas as the hot gas received by the heating chambers.

28. An installation according to claim 17 further comprising a source of fuel gas coupled to at least one heating chamber and adapted for providing fuel gas to the heating chamber for generating heat by combustion and combustion waste gas and wherein the combustion waste gas is provided to one of the heating chambers as the hot gas.

29. An installation according to claim 17 wherein the heating chambers of the zinc-processing furnace connect to heating chambers of a preheating furnace.

30. A method according to claim 1, wherein the step of feeding material into said lead-processing furnace includes tile step of feeding material having lead-containing components that comprise lead-alkali compounds and lead chlorides.

* * * * *